(12) United States Patent
Branigan et al.

(10) Patent No.: US 7,739,147 B2
(45) Date of Patent: Jun. 15, 2010

(54) SYSTEM AND METHOD FOR PALLET IDENTIFICATION BASED ON THRESHOLD OF CASE-LEVEL TAGS

(75) Inventors: James Peter Branigan, Apex, NC (US); Christian Lee Hunt, Cary, NC (US); John Kenneth Senegal, Durham, NC (US); Gregory Covert Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/422,548

(22) Filed: Jun. 6, 2006

(65) Prior Publication Data
US 2007/0282716 A1  Dec. 6, 2007

(51) Int. Cl.
*G06G 1/14* (2006.01)
(52) U.S. Cl. .............................. 705/22; 705/14; 705/23; 705/26; 705/28; 705/29; 235/383; 235/494
(58) Field of Classification Search .................... 705/22
See application file for complete search history.

(56) References Cited

U.S. PATENT DOCUMENTS

| | | | |
|---|---|---|---|
| 6,335,685 B1 | 1/2002 | Schrott et al. ............... 340/572 |
| 6,496,806 B1 | 12/2002 | Horwitz et al. ............... 705/28 |
| 6,554,188 B1 | 4/2003 | Johnson et al. ............. 235/385 |
| 6,693,511 B1 | 2/2004 | Seal .......................... 340/10.1 |
| 2002/0089434 A1 | 7/2002 | Ghazarian ................... 340/988 |
| 2003/0089771 A1 | 5/2003 | Cybulski et al. ............ 235/385 |
| 2004/0000585 A1* | 1/2004 | Silverbrook et al. ........ 235/383 |
| 2004/0064016 A1 | 4/2004 | Kobayashi et al. .......... 600/109 |

(Continued)

FOREIGN PATENT DOCUMENTS

WO    WO0046771 A1    8/2000

(Continued)

OTHER PUBLICATIONS

WDN Analysis: Why RFID's Time Is Now. Wireless Data News, Nov. 1993. vol. 11, No. 23, p. 0.*

(Continued)

*Primary Examiner*—F. Zeender
*Assistant Examiner*—Fawaad Haider
(74) *Attorney, Agent, or Firm*—Van Leeuwen & Van Leeuwen (57) ABSTRACT

A system, method, and program product that uses statistical sampling to determine whether a pallet has been received when the pallet-level RFID tag is not read. When a shipment is unloaded, the system keeps track of the item-level RFID tags that are received. A threshold is retrieved and compared with the number of item-level RFID tags that were received. If the threshold is 50%, then the pallet would be assumed to be received and marked accordingly in the manifest if 50% of the items in the pallet were received. Threshold levels can be customized based upon the vendor shipping the goods, the type of goods being shipped, or both. In addition, the vendor quality rating and the type of good rating can be combined to form a single threshold that incorporates the vendor's quality along with the material (interference) quality of the goods on the particular pallet.

2 Claims, 7 Drawing Sheets

U.S. PATENT DOCUMENTS

| | | | |
|---|---|---|---|
| 2004/0074976 A1 | 4/2004 | Becker et al. | 235/492 |
| 2004/0181461 A1* | 9/2004 | Raiyani et al. | 705/26 |
| 2004/0195341 A1* | 10/2004 | Lapstun et al. | 235/494 |
| 2005/0097595 A1 | 5/2005 | Lipsanen et al. | 725/25 |
| 2006/0036485 A1* | 2/2006 | Duri et al. | 705/14 |
| 2006/0080819 A1* | 4/2006 | McAllister | 29/403.3 |

FOREIGN PATENT DOCUMENTS

WO  WO2005024595 A2  3/2005

OTHER PUBLICATIONS

Office action for U.S. Appl. No. 11/422,537, May 28, 2008, 9 pages.

* cited by examiner

SYSTEM AND METHOD FOR PALLET IDENTIFICATION BASED ON THRESHOLD OF CASE-LEVEL TAGS

BACKGROUND OF THE INVENTION

1. Technical Field

The present invention relates in general to a system and method for identifying pallet-level Radio Frequency Identification (RFID) tags when such tags are not readable. In particular, the present invention relates to a system and method that uses statistical data on items within the pallet to determine whether the pallet was received.

2. Description of the Related Art

Radio Frequency Identifiers (RFID) is a means of identifying a unique object that has been tagged with a physical RFID tag by using a radio frequency transmission. Data stored in the RFID tags (also called transponders) is wirelessly transmitted to readers (also called interrogators) in an automated fashion. RFID readers can be stationary or portable, such as handheld readers. One example of a stationary reader is a reader that is installed proximate to a loading dock door to read tags from objects being moved through the dock doors.

RFID tags are affixed to objects. Each RFID tag includes an embedded microchip where information about the object is stored. RFID tags are typically powered by a radio frequency signal sent by the RFID reader. In response to receiving the radio frequency signal, the RFID tag responds by transmitting the identification data stored on the RFID. The radio frequency signals received by the RFID tags may be sent over a range of distances. When many objects are in proximity to a RFID reader, each of the RFID tags that receives the radio frequency signal responds by transmitting the data encoded on the RFID tag.

For example, assume 1,000 RFID-tagged objects are in proximity to an RFID reader that sends a radio frequency signal. Because of positioning of the objects, only 500 of the RFID-tagged objects receive the radio frequency signal, then these 500 RFID tags would transmit identification data back to the RFID reader. Each time the RFID reader sends the radio frequency signal all of the RFID tags that receives the signal responds by transmitting the RFID data irregardless of whether the RFID tags have already been read. Assume that, in our example, the objects are being moved past the reader that periodically sends out the radio frequency signal. As objects are repositioned, some tags that did not originally receive the signal now receive the signal due to their new position in proximity to the RFID reader. Some objects, such as metal or aluminum cans filled with liquid (e.g., soda cans), may act as an insulator that prevents some of the RFID tags from receiving the radio frequency signal even while when the objects are moved. Other tags may not be able to be read because they are surrounded by too many other objects, such as a tag in the middle of a pallet.

As used herein, a pallet is a portable container, or platform, used for storing and moving objects, such as cargo or freight. Pallets are often used to store and move case goods. The cases and other objects stored on an individual pallet may be all of the same type (e.g., a pallet that only has boxes (cases) of oranges) or may have cases or objects of different types (e.g., a pallet that has some cases of oranges, some cases of apples, etc.). A pallet identifier is an RFID tag that uniquely identifies a particular pallet of goods. Each of the cases or objects included in the pallet is also uniquely identified. Using the examples from above, in the first example, a unique pallet identifier would be affixed somewhere on the pallet and each of the cases of oranges would also have RFID tags that uniquely identify each of the cases. Likewise, in the mixed-case example, a unique pallet identifier would be affixed somewhere on the pallet and each of the cases of oranges, apples, etc., would also have RFID tags affixed that uniquely identify the various objects (cases) included in the pallet.

In modern distribution settings, when goods are shipped the distributor (shipper) sends an electronic manifest to the customer (receiver). The electronic manifest details the pallet identifiers as well as the case level identifiers. When the customer receives the shipment, the customer's RFID readers read the tags on the pallets and cases and compares the tags that were read with the data included in the electronic manifest.

A challenge encountered when receiving goods by a receiver is that the pallet RFID tags may be damaged, missing, or be otherwise unreadable. When the receiver matches the pallet-level tags against the electronic manifest, an error condition will be noted and, oftentimes, a dock worker will be asked to manually check for pallet that was not identified by the RFID readers. Depending upon the size of the shipment, this manual check may take a considerable amount of time which is costly both in terms of dock worker productivity as well as dock throughput. Moreover, other shipments waiting to be unloaded may have to wait until the manual inspection has occurred and the missing pallet(s) have been identified.

What is needed, therefore, is a system and method that uses statistical sampling to determine whether a pallet has been received when the pallet-level RFID tag is not read. Furthermore, what is needed is a system and method that allows for changing threshold levels that trigger the successful receipt of a pallet based on the vendor (shipper) as well as the type of goods on the pallet.

SUMMARY

It has been discovered that the aforementioned challenges are resolved using a system, method, and program product that uses statistical sampling to determine whether a pallet has been received when the pallet-level RFID tag is not read. Due to a variety of reasons, a pallet-level RFID may be unreadable. For example, the pallet-level RFID tag may be damaged, missing, or not readable due to its proximity on the pallet (e.g., blocked by items on the pallet). When a shipment is unloaded, the system keeps track of the item-level RFID tags that are received. For example, a pallet may include 10 cases each of oranges, bananas, and apples with each of the 30 cases having an RFID tag uniquely identifying the item. In this example, assume that the pallet-level tag cannot be read, but that 20 of the 30 item-level tags is read. A threshold is retrieved and compared with the number of item-level RFID tags that were received. In this example, if the threshold is 50% (15 items), then the pallet would be assumed to be received and marked accordingly in the manifest. However, in the example, if the threshold was higher, such as 80%, then the threshold would not be reached and the pallet would not be marked as received (error processing would then investigate the missing pallet, often using manual procedures).

In one embodiment, the threshold level can be customized based upon the vendor shipping the goods, the type of goods being shipped, or both. In this manner, a vendor with a good reputation for accurately shipping items can have a lower threshold than a vendor with a poor reputation for shipping items accurately. Likewise, some types of goods, such as metal or aluminum soda cans filled with liquid, cause interference with the RFID scanners. A pallet that contains items that cause interference can also have a lower threshold, while a pallet of goods of a type that does not cause interference, can have a higher threshold. In addition, the vendor quality rating and the type of good rating can be combined to form a single threshold that incorporates the vendor's quality along with the material (interference) quality of the goods on the particular pallet.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
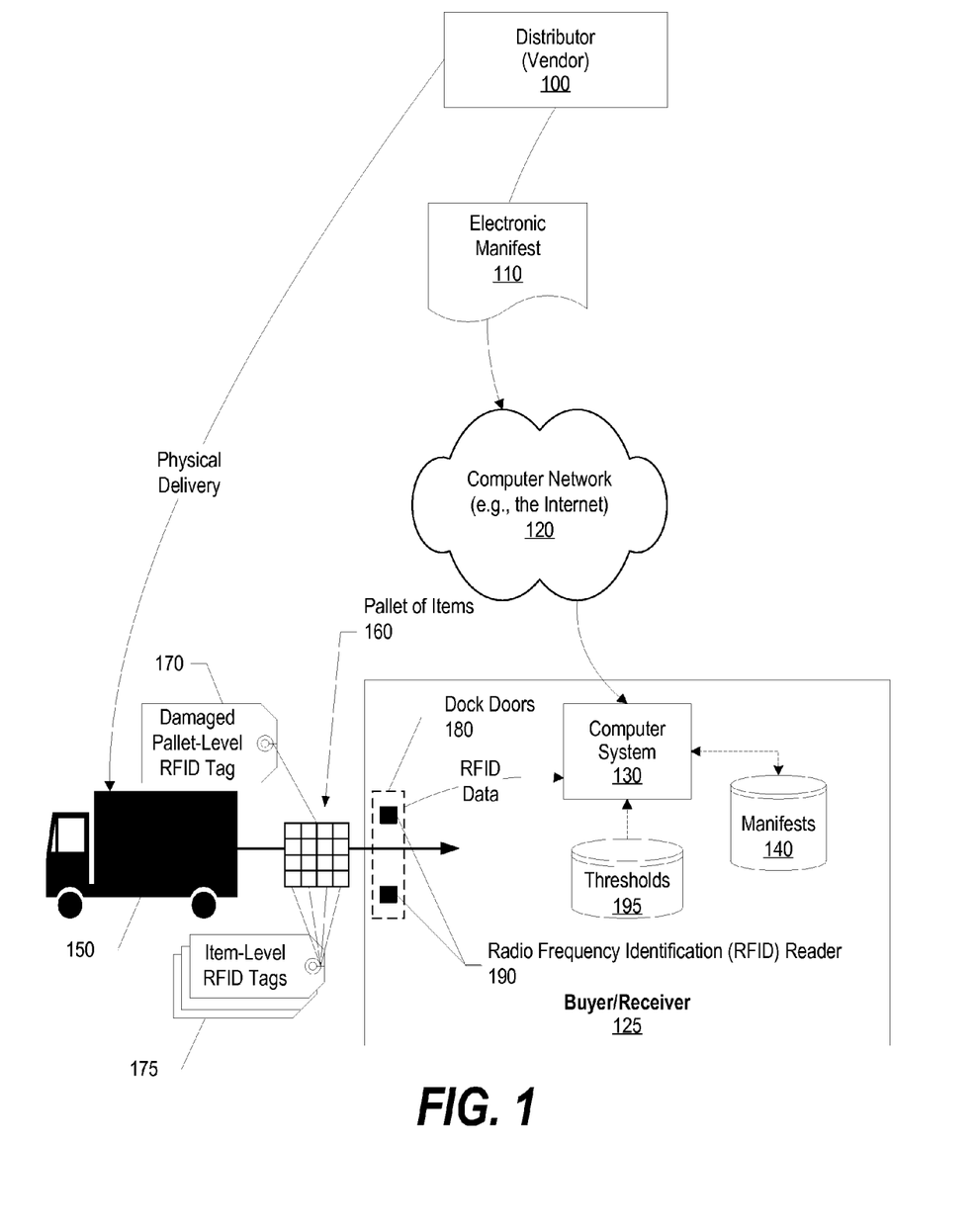
FIG. 1 is a block diagram showing a modern distribution scheme using electronic manifests and RFID tags and readers.

FIG. 1 is a block diagram showing a modern distribution scheme using electronic manifests and RFID tags and readers. Distributor 100, such as a shipper, seller, distributor or other sender, sends electronic manifest 110 through network 120 to buyer/receiver 125. The manifest can be transmitted long before the actual goods are shipped and details the goods that are shipped including the radio frequency identifier (RFID) tags that have been affixed to the pallets (pallet-level RFID tags) and individual goods (item-level RFID tags). The network can be a large publicly accessible network, such as the Internet or the PSTN (using modems to send and receive the data), or can be a private network linking the distributor with the buyer/receiver.

Buyer/receiver 125 receives the electronic manifest using computer system 130 and stores the manifests in data store 140. Some time after the manifest has been received, physical delivery of the goods takes place. Freight-carrying vehicle 150, such as a truck, train, airplane, etc., arrives at the buyer/distributor's dock doors 180 with one or more pallets of goods. In FIG. 1, pallet 160 arrives with a damaged (or missing) pallet-level tag 170. Pallet 160 also includes a number of individual items, such as individual cases, with each item having its own RFID tag (item-level tags). When goods pass through dock doors 180, they also pass through radio frequency identification (RFID) reader 190 that reads the pallet-level and item-level RFID tags. This data is processed by computer system 130 which then compares the pallet- and item-level RFID tags that are received with those that were included in electronic manifest 110 and stored in data store 140.

When a pallet-level tag is not read, computer system 130 reads (or computes) threshold data 195 to determine the number of individual items that need to be read to trigger assumed acceptance of the pallet. If the threshold is reached, the computer system marks the pallet as being received even though the pallet-level RFID tag was missing or damaged.

Figure 2:
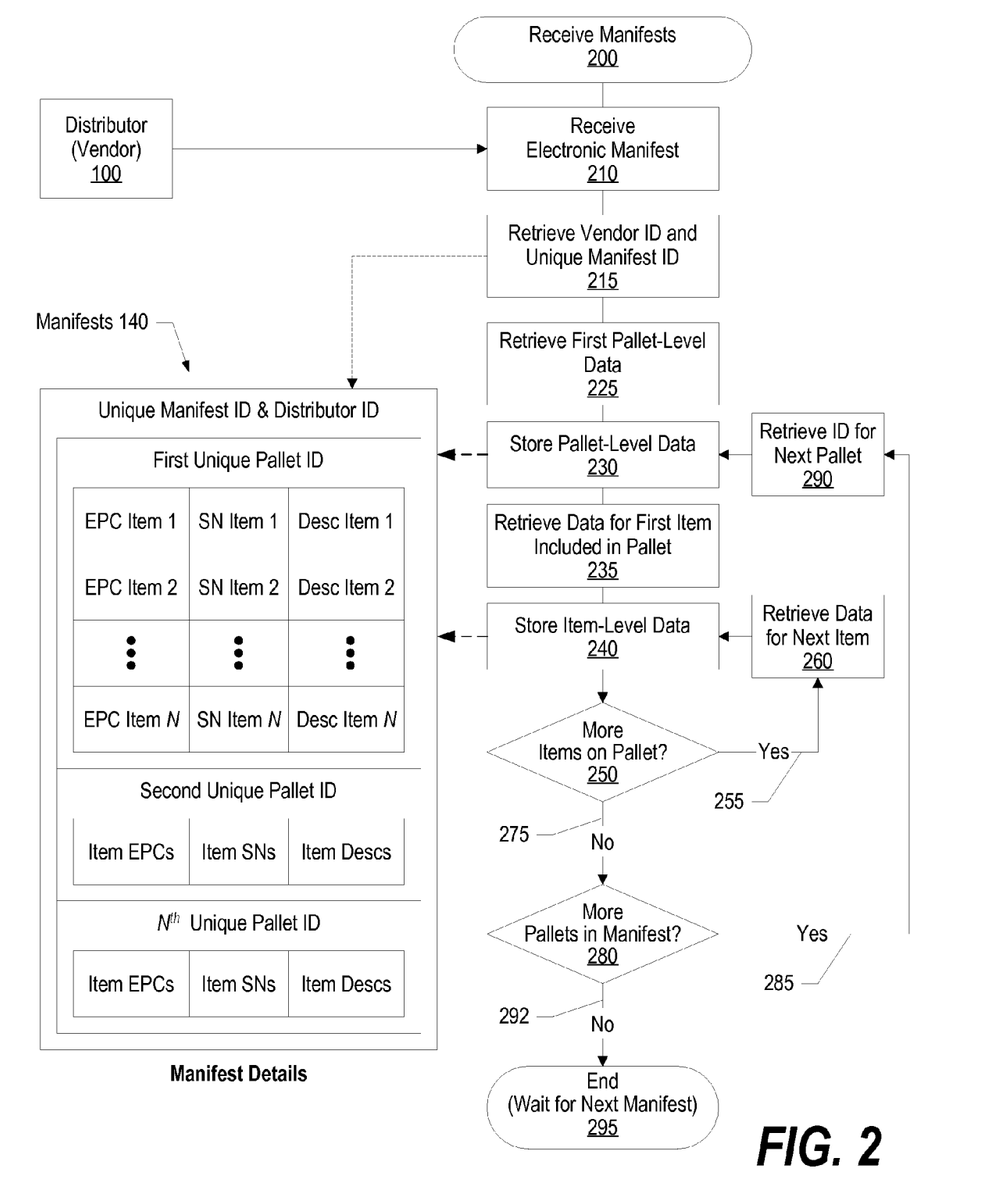
FIG. 2 is a flowchart showing the steps taken to receive and store data from an electronic manifest before the physical goods arrive.

FIG. 2 is a flowchart showing the steps taken to receive and store data from an electronic manifest before the physical goods arrive. Processing commences at 200 whereupon, at step 210, the receiver receives electronic manifest 140 from distributor 100. In one embodiment, the manifest is sent over a public network, such as the Internet. The contents of the manifest can be encrypted depending on the sensitivity of the manifest. If the manifest was encrypted, the receiver decrypts the encrypted manifest based on the type of encrypting using known encryption/decryption algorithms. Steps 215 through 290 detail processes for reading and processing the data in the electronic manifest which would be used if the electronic manifest that was received is in a different format than that used by the receiver. If the format of the received electronic manifest is the same as that used by the receiver, then the received manifest could simply be stored in a data store accessible by the receiver's computer system.

At step 215, the distributor (e.g., vendor) identifier is retrieved along with a unique manifest identifier assigned by the distributor (vendor). In addition, the receiver may generate and store a second unique manifest identifier used by the receiver's processes. The manifest details pallets and items sent from the vendor to the receiver. At step 225, data corresponding to the first pallet in the manifest is retrieved. Pallet data includes the pallet-level RFID tag data (i.e., the data that was encoded on the physical RFID tag that was affixed to the pallet). This includes a pallet-level identifier that uniquely identifies the pallet. At step 230, the pallet data is stored in a data store accessible to the receiver's computer system. At step 235, data corresponding to the first item listed in the manifest for the selected pallet is retrieved. In one embodiment, items are listed in the manifest by pallet so that data for the first pallet's items is retrieved before data is retrieved for the second and subsequent pallets' items. At step 240, the item data is stored in the data store. Some manifest details are shown in manifest 140. For example, each pallet is shown with a unique identifier and each item is shown with an electronic product code (EPC), a serial number (if applicable), and a description.

A determination is made as to whether there are more items on the pallet that need to be read (decision 250). If there are more items on the pallet, decision 250 branches to "yes" branch 255 whereupon, at step 260, data is retrieved for the next item in the pallet and processing loops back to store the data in the data store. This looping continues until all items included on the pallet have been processed, at which time decision 250 branches to "no" branch 275. A determination is then made as to whether there are more pallets to process in the manifest (decision 280). If there are more pallets listed in the manifest, decision 280 branches to "yes" branch 285 whereupon, at step 290, the next pallet-level identifier is retrieved from the manifest and processing loops back to store the pallet-level data and retrieve and store the item-level data corresponding to the pallet. This looping continues until all pallets listed in the manifest have been processed, at which time decision 280 branches to "no" branch 292 and processing ends at 295.

Figure 3:
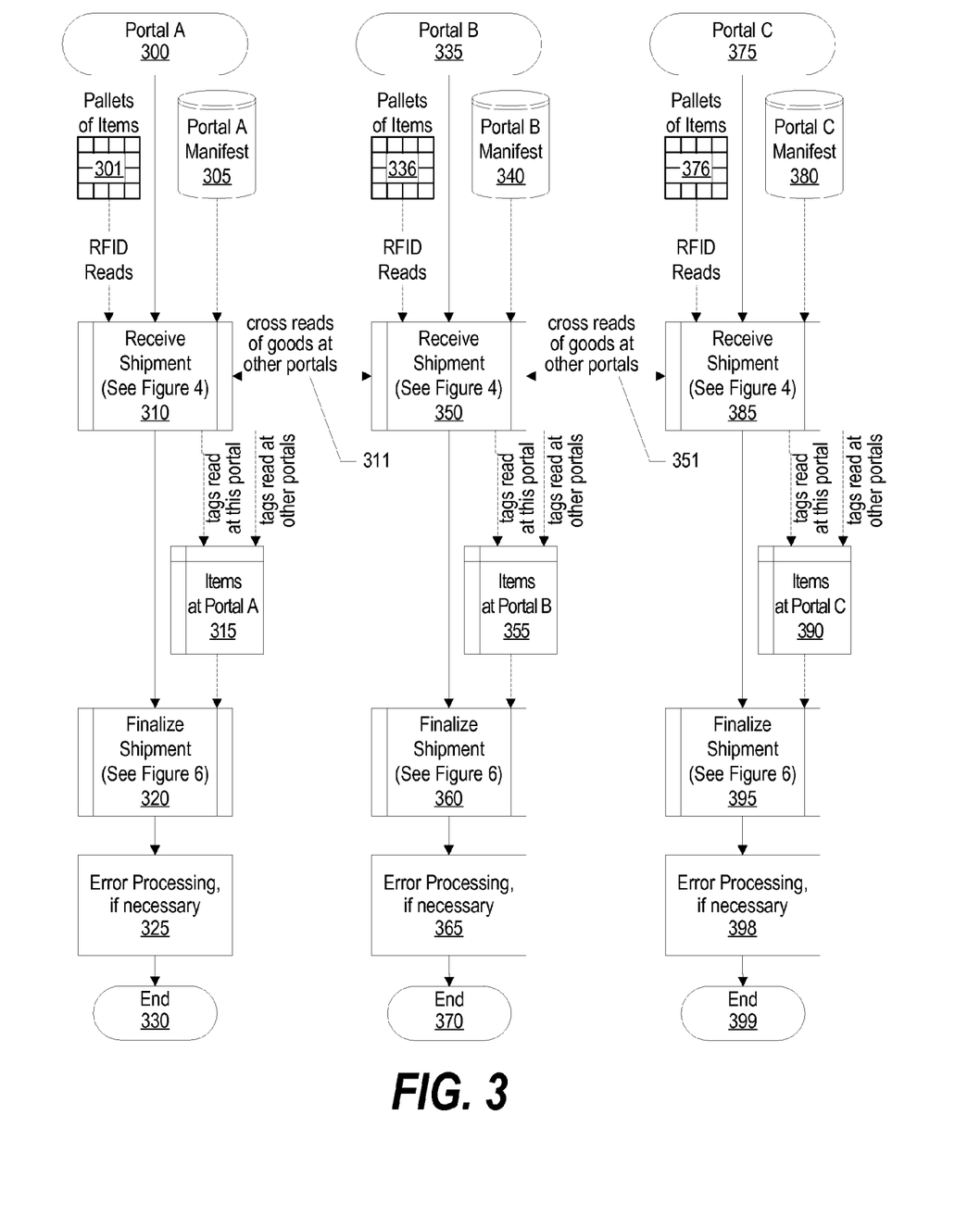
FIG. 3 shows three flowcharts of cross-reads being handled by three different portals (RFID readers)

FIG. 3 shows flowcharts of cross-reads being handled by three different portals (Portal A, Portal B, and Portal C). As previously described, an area where goods arrive and RFID tags are read, such as a dock door equipped with an RFID reader, is referred to as a "portal." Processing for Portals A, B, and C commences at 300, 335, and 375, respectively. In the example shown, a different pallet is being received at each portal. Portal A is receiving pallet 301, Portal B is receiving pallet 336, and Portal C is receiving pallet 375. In addition, each portal checks its respective pallet against a manifest (manifest 305 corresponding to Portal A, manifest 340 corresponding to Portal B, and manifest 380 corresponding to Portal C). A predefined process is used to process the various shipments (predefined process 310 used to receive the shipment at Portal A, predefined process 350 used to receive the shipment at Portal B, and predefined process 385 used to receive the shipment at Portal C). The steps for the predefined processes are the same (see FIG. 4 and corresponding text for processing details). However, in one embodiment, a separate process is started to handle each portal. Dataflows 311 and 351 show cross-read tag data being sent from one process to another. While Portal A and Portal C do not have a dataflow connecting them, data can also flow between these portals as well.

A data store, such as a memory area, stores the items at a particular portal. Memory area 315 stores data read by the RFID reader at Portal A as well as RFID tag data read at other portals but recognized as belonging to Portal A. Likewise, memory area 355 stores data read by the RFID reader at Portal B as well as RFID tag data read at other portals but recognized as belonging to Portal B, and memory area 390 stores data read by the RFID reader at Portal C as well as RFID tag data read at other portals but recognized as belonging to Portal C. When goods are finished being unloaded at a portal, a Finalize Shipment process executes to determine if items are missing. Predefined process 320 finalizes the shipment at Portal A, predefined process 360 finalizes the shipment at Portal B, and predefined process 395 finalizes the shipment at Portal C. The steps for the predefined processes are the same (see FIG. 6 and corresponding text for processing details). However, in one embodiment, a separate process is started to handle each portal. After Finalize Shipment processing as taken place, discrepancies between the respective manifest and the pallets and items received at Portals A, B, and C are handled by error processing (steps 325, 365, and 398, respectively). Processing of the shipments at Portal A, B, and C then ends at 330, 370, and 399, respectively.

Figure 4:
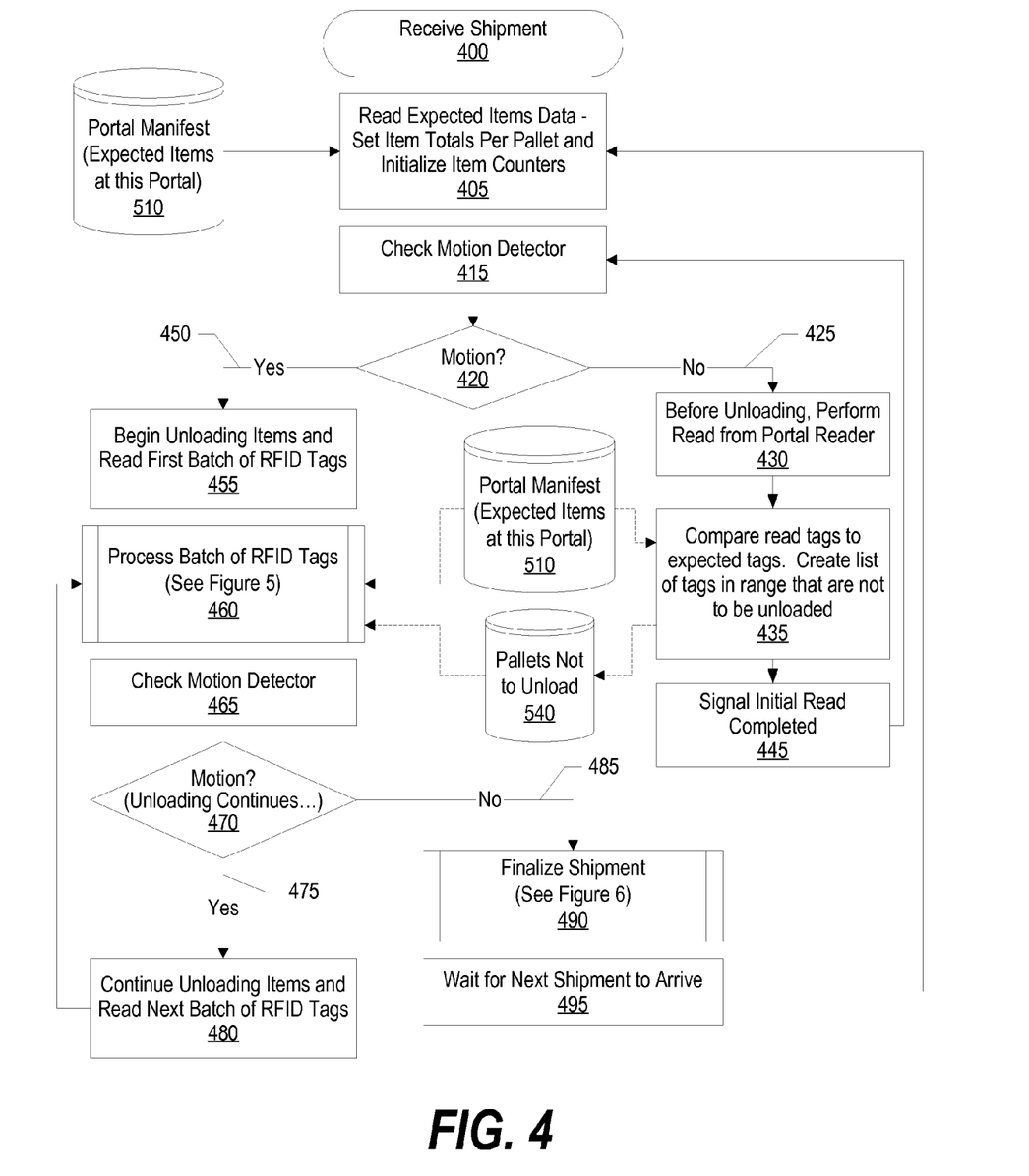
FIG. 4 is a flowchart showing the steps taken to receive a shipment of goods with affixed RFID tags.

FIG. 4 is a flowchart showing the steps taken to receive a shipment of goods with affixed RFID tags. In one embodiment, a separate instance of the process shown in FIG. 4 is launched for each portal that is receiving shipments. Processing commences at 400 whereupon, at step 405, the expected pallet and item data expected at this portal is read from manifest 410. In addition, certain values are initialized. The amount of items expected for each pallet are either retrieved or calculated. In addition, counters that keep track of the number of items received for each pallet are initialized (e.g., set to zero (0)), and flags that track whether each pallet and item have been received are initialized to "no" (indicating that nothing has been received yet).

At step 415, a motion detector at the portal is checked. Prior to unloading the shipment, the operator(s) open the cargo (e.g., semi truck) doors and stop activity in order for the motion detector to detect no motion. In an alternate embodiment, the operator can press a switch or button to signal that a shipment is about to be unloaded to avoid using the motion detectors. A determination is made as to whether motion is detected (decision 420). When no motion is detected, decision 420 branches to "no" branch 425 to perform an initial read using the RFID reader (step 430). This initial read detects whatever RFID tags that can be read with the cargo doors open, including some pallet-level RFID tags at the back of the truck or cargo carrier. At step 435, the RFID tag data read during the initial read are compared with the expected tags in order to create a list of tags that were read by the RFID reader but are not on the manifest. A list of pallets that are not to be unloaded is created and stored in data store 440. At this point (step 445), the initial read is complete and processing loops back to start unloading the shipment.

Returning to step 415, the motion detector is checked and, at decision 420, if there is motion (indicating that the shipment is being unloaded), decision 420 branches to "yes" branch 450 for unloading processing. At step 455, the operators begin unloading pallets of items and the RFID reader continually scans for RFID tags. After the RFID reader scans for RFID tags, tag data for any tags within range of the RFID reader are stored in a memory and are processed (predefined process 460, see FIG. 5 and corresponding text for processing details). After the batch of RFID tags has been processed, at step 465 the motion detector is again checked to see if the shipment is still being unloaded. A determination is made as to whether motion was detected by the motion detector (decision 470). If motion was detected, decision 470 branches to "yes" branch 475 whereupon, at step 480, operators continue to unload pallets from the shipment and processing loops back to process the next batch of RFID tags read by the RFID reader.

Unloading and processing batches of RFID tags continues until motion is no longer detected, indicating that unloading of the shipment has completed, at which point decision 470 branches to "no" branch 485. When unloading is complete, the shipment is finalized (predefined process 490, see FIG. 6 and corresponding text for processing details), and then processing waits for the next shipment to arrive for unloading (step 495). When the next shipment arrives, processing loops back to step 405 to read the next manifest and initialize the counters and flags.

Figure 5:
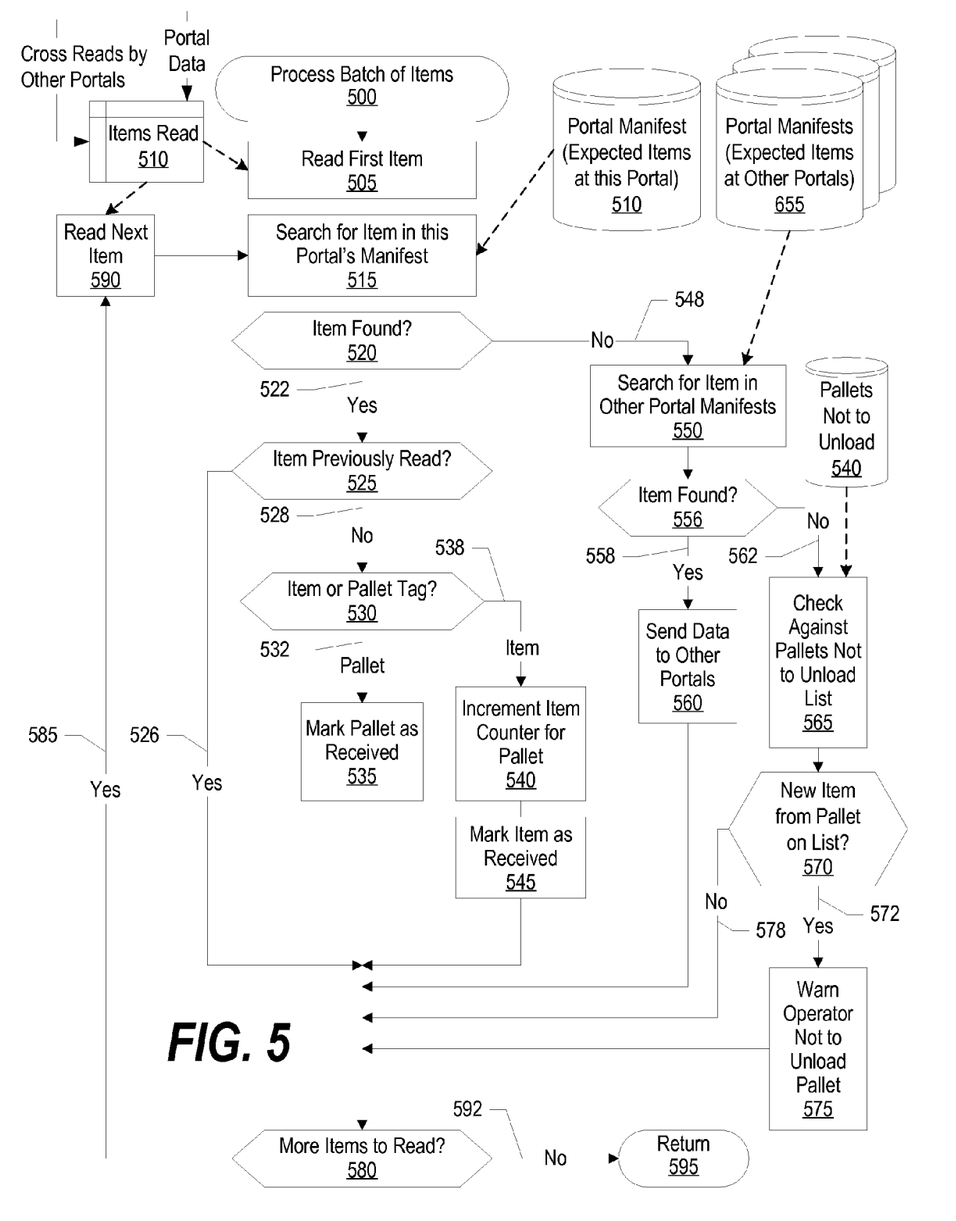
FIG. 5 is a flowchart showing the steps taken to process a batch of RFID tags read during the receiving process.

FIG. 5 is a flowchart showing the steps taken to process a batch of RFID tags read during the receiving process. Processing commences at 500 whereupon, at step 505, the first item is read from items read memory 510. As shown, the items read memory includes both RFID tags read by this portal's RFID reader as well as cross-read RFID tags read by other RFID readers. In one embodiment, the items read data memory is one memory area, while in another embodiment, the items read memory includes one memory area for the RFID tag data read by this portal's RFID reader and one or more memory areas for cross-read RFID tag data (e.g., one memory area can be used for all portals to store cross-read RFID tag data or a separate memory area can be allocated for each portal for storing that portal's cross-read RFID tag data). At step 515, the identifier corresponding to the item that was just read is used to search portal manifest 510 (e.g., the pallets and items expected to arrive at this portal).

A determination is made as to whether the RFID tag that was just read was found in portal manifest 510 (decision 520). If the RFID tag was found, decision 520 branches to "yes" branch 522 whereupon a determination is made as to whether the RFID tag was read during a previous read by the RFID reader and has already been marked as being received (decision 525). If the item has already been read, decision 525 branches to "yes" branch 526 to bypass steps 530 through 545. On the other hand, if this is the first time that this RFID tag has been read by the reader, decision 525 branches to "no" branch 528 whereupon A determination is made as to whether the RFID tag is a pallet-level RFID tag or an item-level RFID tag. If the tag is a pallet-level tag, decision 530 branches to "pallet" branch 532 whereupon, at step 535, the data record in the manifest corresponding to the pallet is marked as received. If the tag is an item-level tag, decision 530 branches to "item" branch 538 whereupon, at step 540, the item counter (indicating the number of items received for this pallet) is incremented, and at step 545, the item is marked as received in the manifest.

Returning to decision 520, if the pallet or item tag is not found in portal manifest 510, decision 520 branches to "no" branch 548 whereupon, at step 550, the manifests corresponding to other portals (data stores 555) are searched for the RFID tag that was just read. A determination is made as to whether the item or pallet tag was found in one of the other portals' manifests indicating that the item is likely being unloaded at a nearby portal (decision 556). If the item was found on another portal's manifest (indicating a cross-read), decision 556 branches to "yes" branch 558 whereupon, at step 560, the cross-read RFID tag data is sent to one or more other portals for processing. On the other hand, if the item was not found on another portal's manifest, decision 556 branches to "no" branch 562 whereupon, at step 565, the pallets not to be unloaded are checked (data store 540) to determine if the RFID tag is a pallet- or item-level RFID tag of an item that should not be unloaded (e.g., an pallet or item on a truck destined to be received by another customer). A determination is made as to whether the item or pallet tag was previously read during the initial read (decision 570). If the pallet or item level tag was not read during the initial read and the item is not on any of the portal manifests, then decision 570 branches to 572, whereupon, at step 575 the operator is warned that a pallet (or item) may be in the process of being unloaded that should remain on the truck. On the other hand, if the RFID tag was read during the initial read by the RFID reader (when the motion sensor detected no motion), then decision 570 branches to "no" branch 578 bypassing step 575.

A determination is made as to whether there are more items to process that were stored in the items read memory area (decision 580). If there are more items to process, then decision 580 branches to "yes" branch 585 whereupon, at step 590, data for the next item is read from items read memory area 510 and processing loops back to process the newly read item. This looping continues until all entries in items read memory area 510 have been read, at which time decision 580 branches to "no" branch 592 and processing returns at 595.

Figure 6:
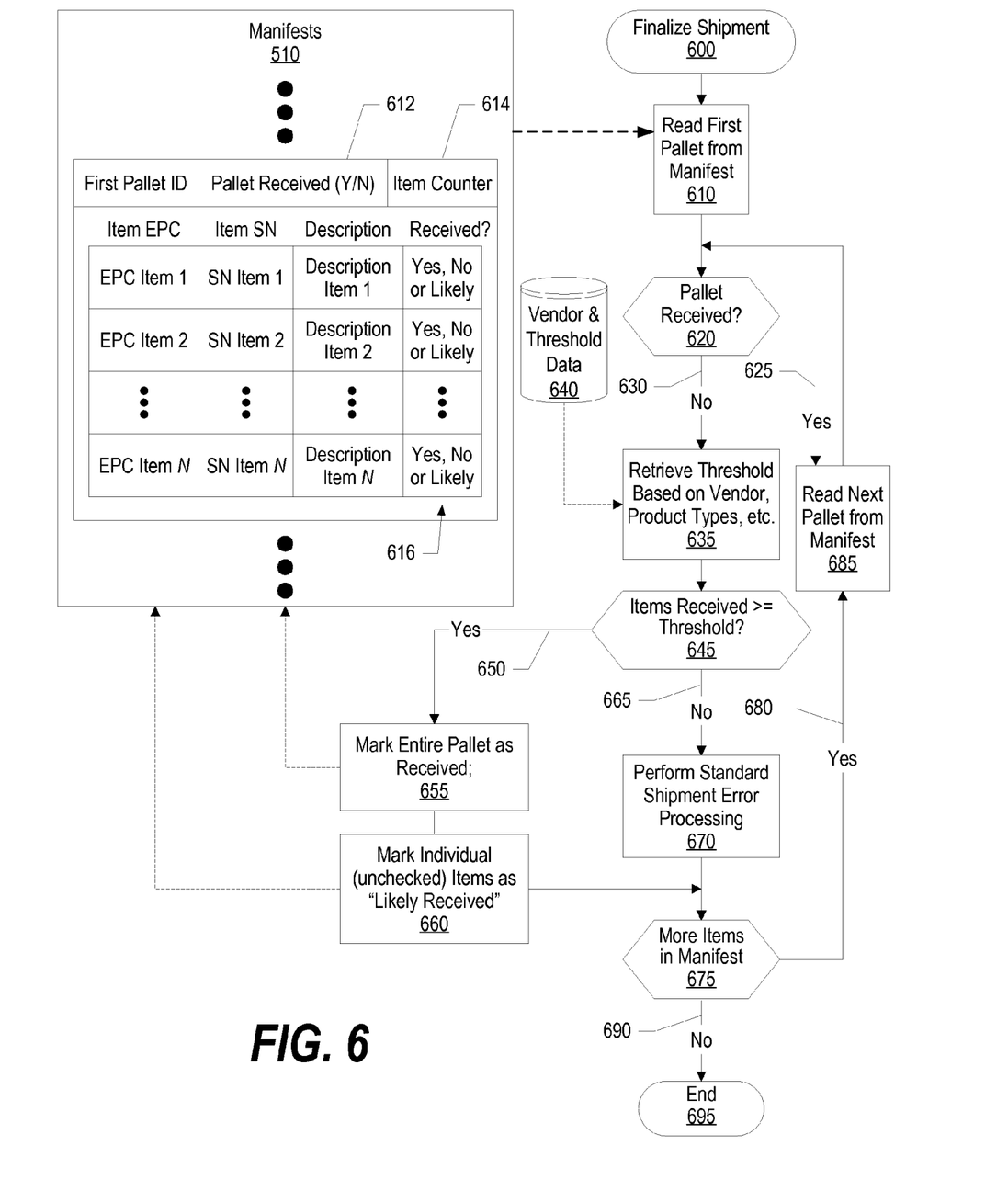
FIG. 6 is flowchart of the steps taken to finalize a shipment that is being received.

FIG. 6 is flowchart of the steps taken to finalize a shipment that is being received. After the shipment has been unloaded, manifest 510 will reflect the pallets and individual items whose RFID tags were read by the RFID readers. Fields were added to manifest 510 to store tracking information that was updated when the shipment was unloaded. These fields include pallet received flag 612, item counter 614, and item received flag 616. Pallet received flag 612 was initialized as "no" for each pallet prior to unloading the shipment. When the RFID reader read one of the pallet-level RFID tags, the corresponding record was marked as "yes" indicating that the pallet was received. Likewise, item received flag 616 was initialized as "no" for each item prior to unloading the shipment. When the RFID reader read one of the item-level RFID tags, the corresponding record was marked as "yes" indicating that the item was received. Item counter 614 was initialized to zero for each pallet prior to unloading the shipment. When the RFID reader read one of the item-level RFID tags belonging to the pallet, the pallet's item counter was incremented keeping track of the number of items that were read for each pallet.

After shipment unloading has stopped, the processing shown in FIG. 6 commences at 600 whereupon, at step 610, the first pallet-level record is read from portal manifest 510. A determination is made as to whether the pallet was marked as being received during unloading of the shipment (decision 620). If the pallet was marked as being received, decision 620 branches to "yes" branch 625 whereupon, at step 685, the next pallet-level record is read from the manifest and processing loops back to process the newly read pallet-level record. On the other hand, if the pallet was not marked as being received during unloading, decision 620 branches to "no" branch 630 in order to try to determine whether the pallet was actually received but the pallet-level RFID tag was simply not read (e.g., the pallet-level tag was missing, damaged, or otherwise unable to be read by the RFID reader during the unloading operation).

At step 635, vendor and other threshold data is read from vendor and threshold data store 640. Based on past experience, a vendor with a good history of accurately shipping goods can have a low threshold (e.g., 50%) and a vendor with a poor history can have a higher threshold (e.g., 65%) established. The threshold determines how many individual items listed in the manifest as belonging to the pallet need to be read by the RFID reader in order to assume that the entire pallet was received. In lieu of vendor ratings, or in conjunction with such ratings, product type ratings can be established and stored in data store 640. For example, some items, such as metal beverage cans, act as insulators and make it difficult for RFID readers to read attached RFID tags. If product type ratings are used, some product types that are difficult to read due to item characteristics may have a lower threshold established (e.g., 40%), while a product type that is does not interfere with the RFID reader's ability to read RFID tags can have a higher threshold established (e.g., 80%). In addition, vendor ratings and product type ratings can be combined in numerous ways. For example, a vendor with a can have its threshold reduced when the pallet contains difficult to read items (e.g., subtract 25% giving a threshold of 25% (50%-25%) for higher quality vendor and a threshold of 50% for the poorer quality vendor (75%-25%)). Likewise, when the pallet contains easy to read items, the vendor thresholds can be left alone or have percentages added to the vendor threshold for an ultimate threshold.

Item counter 614 is read and evaluated using the retrieved threshold data and a determination is made as to whether the number of items received meets or exceeds the threshold that was set (decision 645). For example, if a pallet included 40 items and the threshold was 50%, then if 20 or greater individual items were marked as "received," then the pallet would be assumed to have been received. However, if fewer than 20 items were received, then the pallet would not be assumed to have been received. If the number of items meets or exceeds the threshold, then decision 645 branches to "yes" branch 650 whereupon, at step 655, the entire pallet is marked as "received" (field 612 is marked as "yes" for received). At step 660, the items in the pallet that were not already marked as being received during the unloading operation are marked as "likely received" using field 616. In this manner, subsequent analysis can distinguish between items with tags that were actually read by the RFID reader and those items that were assumed to have been received. Returning to decision 645, if the number of items received for a pallet does not meet or exceed the threshold, then decision 645 branches to "no" branch 665 whereupon, at step 670, shipment error processing is performed to determine, often manually, whether the pallet was actually received.

After the pallet has been processed, a determination is made as to whether there are more pallet-level records in manifest 510 to process (decision 675). If there are more pallet-level records to process, decision 675 branches to "yes" branch 680 whereupon, at step 685, the next pallet-level record is read from the manifest and processing loops back to process the newly read pallet-level record. This looping continues until all pallet-level records in the manifest have been read, at which time decision 675 branches to "no" branch 690 and processing ends at 695.

Figure 7:
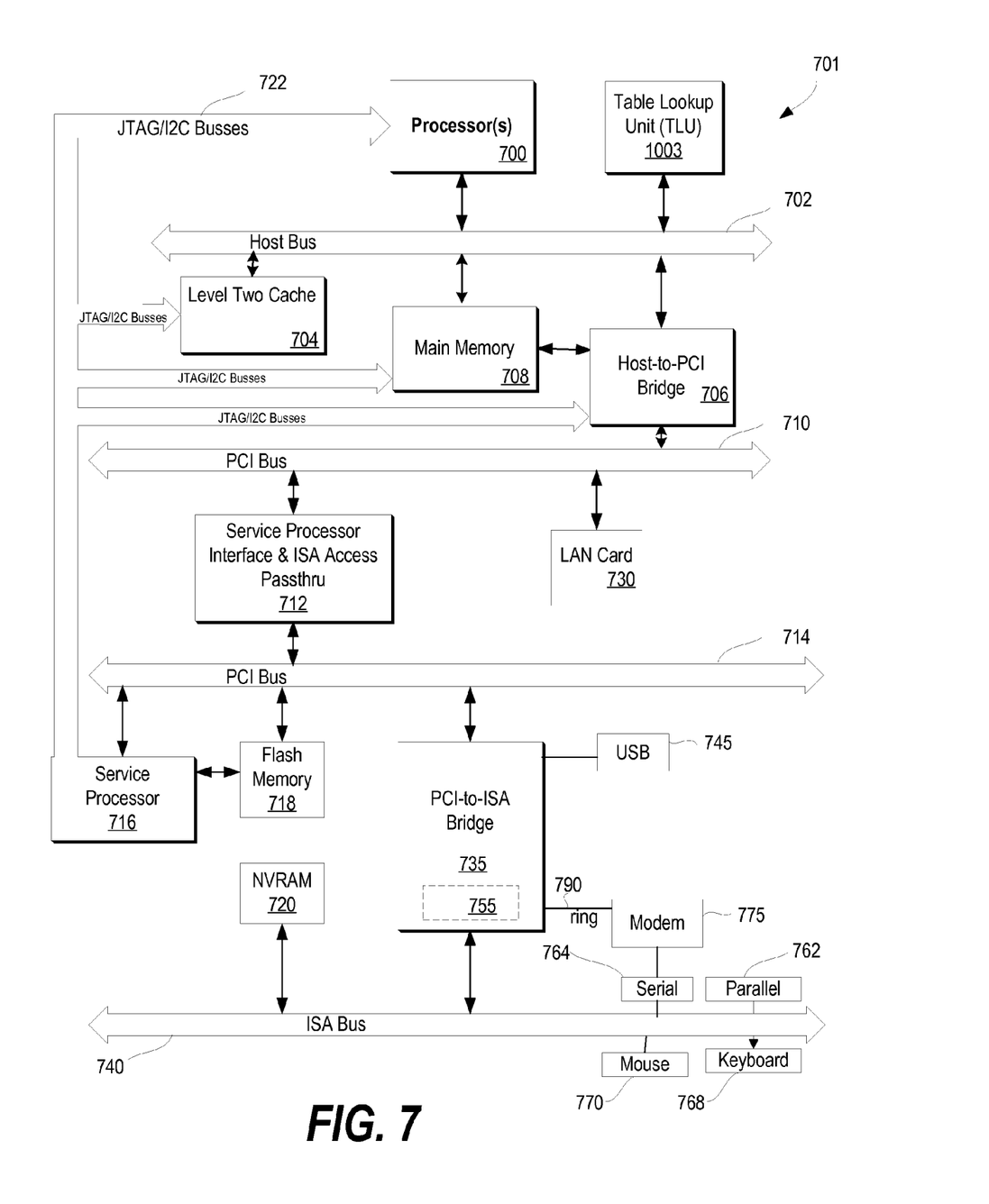
FIG. 7 is a block diagram of an information handling system in which the processes described herein may be implemented.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740.

Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is a software program, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    reading a plurality of Radio Frequency Identification (RFID) tags that are in proximity to an RFID reader while the RFID tags, affixed to a plurality of objects, are being unloaded, wherein a plurality of the RFID tags are pallet-level RFID tags and a plurality of the RFID tags are item-level RFID tags;
    marking as received each record in a manifest that corresponds to each of the read RFID tags, wherein a plurality of the marked records are item-level records and wherein at least one of the marked records is a pallet-level record;

identifying an unmarked pallet-level record in the manifest, wherein the unmarked pallet-level record was not marked as received;

tallying a count of a number of item-level records marked as received that correspond to the unmarked pallet-level record;

identifying a vendor and a type of good corresponding to the unmarked pallet-level record;

retrieving a vendor rating based upon the identified vendor;

retrieving a type of goods error rating based upon the identified type of good;

computing a threshold based upon the vendor rating and the type of goods error rating;

comparing the tallied count to the computed threshold; and in response to the comparison revealing that the tallied count of the number of item-level records marked as received is equal to or greater than the computed threshold, marking the unmarked pallet-level record as received and marking the unmarked item-level records that correspond to the pallet-level record as likely received, and in response to the tallied count being less than the computed threshold, performing shipment error processing for the pallet corresponding to the unmarked pallet-level record.

2. A computer program product stored in a computer readable medium, comprising functional descriptive material that, when executed by a data processing system, causes the data processing system to perform actions that include:

reading a plurality of Radio Frequency Identification (RFID) tags that are in proximity to an RFID reader while the RFID tags, affixed to a plurality of objects, are being unloaded, wherein a plurality of the RFID tags are pallet-level RFID tags and a plurality of the RFID tags are item-level RFID tags;

marking as received each record in a manifest that corresponds to each of the read RFID tags, wherein a plurality of the marked records are item-level records and wherein at least one of the marked records is a pallet-level record;

identifying an unmarked pallet-level record in the manifest, wherein the unmarked pallet-level record was not marked as received;

tallying a count of a number of item-level records marked as received that correspond to the unmarked pallet-level record;

identifying a vendor and a type of good corresponding to the unmarked pallet-level record;

retrieving a vendor rating based upon the identified vendor;

retrieving a type of goods error rating based upon the identified type of good;

computing a threshold based upon the vendor rating and the type of goods error rating;

comparing the tallied count to the computed threshold; and in response to the comparison revealing that the tallied count of the number of item-level records marked as received is equal to or greater than the computed threshold, marking the unmarked pallet-level record as received and marking the unmarked item-level records that correspond to the pallet-level record as likely received, and in response to the tallied count being less than the computed threshold, performing shipment error processing for the pallet corresponding to the unmarked pallet-level record.

* * * * *